United States Patent [19]

Boreland

[11] Patent Number: 4,888,722

[45] Date of Patent: Dec. 19, 1989

[54] PARALLEL ARITHMETIC-LOGIC UNIT FOR AS AN ELEMENT OF DIGITAL SIGNAL PROCESSOR

[75] Inventor: Charles P. Boreland, Waterbury, Conn.

[73] Assignee: General DataComm, Inc., Middlebury, Conn.

[21] Appl. No.: 69,431

[22] Filed: Jul. 2, 1987

[51] Int. Cl.[4] .......................... G06F 7/00; G06F 15/00
[52] U.S. Cl. ................................................. 364/736.5
[58] Field of Search ............. 364/715, 736, 769, 736.5

[56] References Cited

U.S. PATENT DOCUMENTS

| | | | |
|---|---|---|---|
| 3,694,642 | 9/1972 | Grannis | 364/769 |
| 4,156,927 | 5/1979 | McElroy et al. | 364/736 |
| 4,258,429 | 3/1981 | Raymond, Jr. | 364/736 |
| 4,272,808 | 6/1981 | Hartwig | 364/718 |
| 4,367,524 | 1/1983 | Budde et al. | 364/200 |
| 4,467,444 | 8/1984 | Harmon, Jr. et al. | 364/736 |
| 4,520,347 | 5/1985 | Campbell, Jr. | 340/347 DD |
| 4,542,476 | 9/1985 | Nagafuji | 364/749 |
| 4,608,660 | 8/1986 | Hasebe | 364/736.5 |
| 4,639,886 | 1/1987 | Hashimoto et al. | 364/736 |
| 4,649,508 | 3/1987 | Kanuma | 364/748 |
| 4,785,393 | 11/1988 | Chu et al. | 364/736 |

FOREIGN PATENT DOCUMENTS 0171190 2/1986 European Pat. Off. ............ 364/736

OTHER PUBLICATIONS

Hallmark, *The Master IC Cookbook*, pp. 372–375, 1980, TAB Books, USA.
Larsen et al., *The Bugbook II*, pp. 10-25–10-28, 1974, E&L Instruments, Inc. 61 1st St., Derby, Conn. 06418.

*Primary Examiner*—Emanuel S. Kemeny
*Assistant Examiner*—Dale M. Shaw
*Attorney, Agent, or Firm*—David P. Gordon

[57] ABSTRACT

A parallel arithmetic-logic unit (PALU) controlled by a microinstruction sequencer and capable of executing conditional operations in a single pass is disclosed. The PALU generally comprises first and second registers for storing data, a comparator for continually comparing the values in the registers, and an arithmetic-logic core connected to the registers for performing arithmetic, logical and data move operations on the data in the registers. The comparator is preferably an unsigned magnitude comparator which outputs flags indicative of the relative status of the values in the registers. The flags are read by a microinstruction sequencer which then uses the flag information to determine what operation the arithmetic-logic core is to conduct. Preferably, a shifter is also provided between one of the registers and the arithmetic-logic core.

12 Claims, 3 Drawing Sheets

BLOCK DIAGRAM OF DSP AND DATA I/O

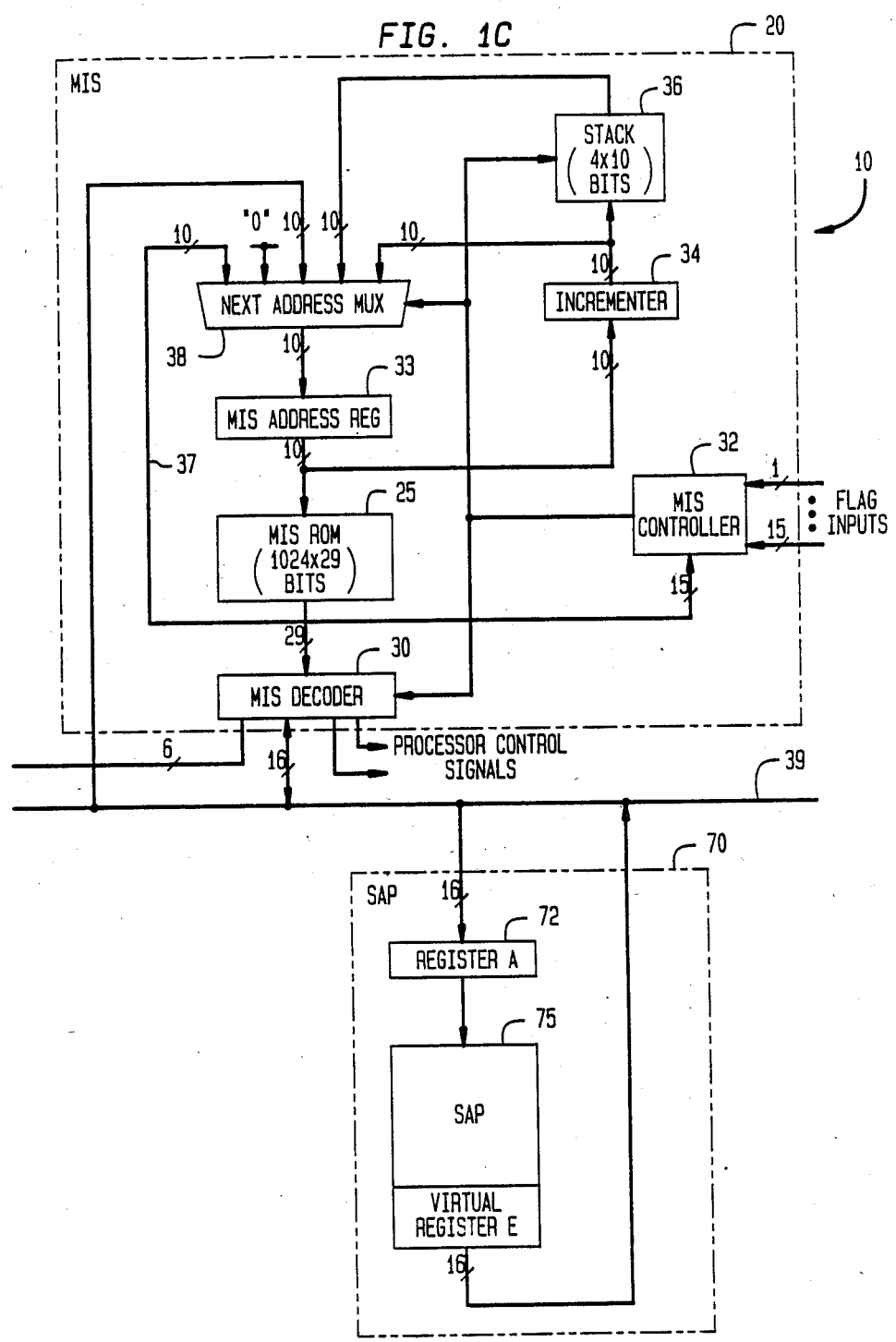

PARALLEL ARITHMETIC-LOGIC UNIT FOR AS AN ELEMENT OF DIGITAL SIGNAL PROCESSOR

This application is related to commonly-owned, concurrently filed applications entitled "Digital Signal Processor Architecture" U.S. Ser. No. 069,433, "Microinstruction Sequencer Capable of Instructing Arithmetic Logical and Data Move Operations in a Conditional Manner" U.S. Ser. No. 069,430, and "Serial Arithmetic Processor" U.S. Ser. No. 069,432, now U.S. Pat. No. 4,858,163, all of which are hereby incorporated by reference herein.

BACKGROUND

The present invention relates to an arithmetic-logic unit (ALU), and more particularly to a parallel arithmetic-logic unit (PALU) for use in a digital signal processing (DSP) microchip which is capable of executing a conditional operation in a single pass through the PALU.

Parallel arithmetic-logic units are well known in the arts (see, e.g. ADSP-2100 User's Manual, Chapter 2.2, Analog Devices Inc., 1986). Typically they contain one or more input registers, an optional shifter, and an arithmetic-logic core. In addition they may contain one or more output registers (accumulators). The PALU's known in the art are capable of conducting many arithmetic and logical operations under the control of a microinstruction sequencer. For example, subtraction and addition of values in the registers and/or accumulators (immediate data from a MIS ROM, and data from a RAM also typically being available as a source of a value) as well as the negation, incrementing, or decrementing of a register or accumulator value may be accomplished. Likewise, logical functions such as the AND, OR or XOR of the values in the registers and/or accumulators may be accomplished by the PALU. The results of the functions (i.e. the values) which can be stored in the accumulators are then typically available for placement on a data bus for sending them to a desired location in the processor.

Those skilled in the art will recognize that the arithmetic and logical operations common to the PALU's of the art as described above are one pass operations; that is, after the related registers are loaded with desired values, a single command from the microinstruction sequencer actuates the desired operation in the PALU, and the PALU is able to accommodate and execute the command in a single cycle without repetitively using the arithmetic-logic core. However, where more complex operations such as limiting (bounding) a variable between an upper and lower limit (i.e. IF A>B THEN A=B, ELSE A=A) is to be acomplished, the PALU's of the art require a two pass operation; that is, the results obtained by the operation of the arithmetic-logic core on first pieces of information are used in the conducting by the arithmetic-logic core of a second operation. For example, in the upper bounding operation, after loading an accumulator or register with a first value A, a first microinstruction would be required to have the PALU compare the first value A with a second value B (probably by subtracting B from A) and to accordingly set a flag to be read by the microinstruction sequencer. Thus, a first pass through the PALU would comprise such a comparison (subtraction). Based on the flag, the microinstruction sequencer would then branch to a desired location in its program and issue a second microinstruction to the PALU to either set A to B or A to A. In the second pass, the PALU would execute the instruction to set A to the appropriately dictated value through the use of a data move command.

The two pass requirement in the PALU for performing operations such as an IF-THEN-ELSE operation has several drawbacks. First, with a two pass arrangement, two sets of communications between the microinstruction sequencer and the PALU are required. The necessity of two sets of communications slows down the flow of the operation as the microinstruction sequencer must first send a command and then await the results of the comparison pass through the PALU before determining the next proper microinstruction. Second, with a two pass arrangement, not only is the operation slowed down, but additional MIS microinstructions are required, thereby necessitating a larger microinstruction sequencer ROM, or alternatively, thereby limiting the range of operations which will be available. Finally, where a comparison of two register values is conducted by a subtraction operation in the arithmetic-logic core, one of the values may be corrupted if a special MIS microinstruction is not provided to specifically avoid corrupting the accumulator register. Thus, yet additional microinstructions would have to be listed in the MIS, and the PALU would be forced to accommodate additional instructions.

SUMMARY OF THE INVENTION

It is therefore an object of the invention to provide a PALU capable of executing conditional operations in a single pass.

It is a further object of the invention to provide a PALU which, in conjunction with a microinstruction sequencer is capable of instructing arithmetic, logic, and data move operations in a conditional manner in a single pass.

In accord with the objects of the invention, a PALU controlled by a microinstruction sequencer, where the PALU is capable of executing conditional operations in a single pass is provided and comprises:
  (a) a first register for storing data;
  (b) a second register for storing data;
  (c) a comparator means, including means for setting at least one flag, said comparator means being connected to said first and second registers, for continually comparing the values of the data in said first and second registers and causing said flag setting means to set at least one flag depending on the results of the comparison, wherein said at least one flag is read by said microinstruction sequencer; and
  (d) an arithmetic-logic core means connected to said first and second registers for performing at least one of an arithmetic, logic and data move operation on at least the data in one of said first and second registers based on instructions from said microinstruction sequencer which were at least partially formed in response to said at least one flag.

With the provided arrangement, it will be appreciated that a conditional operation such as an upper bound may be executed in a single pass through the PALU. Thus, after loading the first and second registers, the comparative status of the registers (i.e. is A>B; is A=B; is A<B) will be automatically available to the microinstruction sequencer via the flags of the comparator. Without having to have first instructed the arithmetic-logic core means of the PALU to conduct a comparison, the microinstruction sequencer can then make a decision as to the what value to set the value A and can issue its first instruction to the arithmetic-logic core means of the PALU. Microinstruction sequencer means for accomplishing this decision and function in a single microinstruction will be seen with reference to the patent application entitled "Microinstruction Sequencer Capable of Instructing Arithmetic Logical and Data Move Operations in a Conditional Manner" Ser. No. 069,430, which has already been incorporated herein by reference.

Preferably, the PALU of the invention further includes at least one shifter connected to at least one of the registers. The shifter reads the data of the register, shifts it in response to instructions of the microinstruction sequencer, and then supplies the shifted data to the arithmetic-logic core means. The shifter permits the the PALU to execute commands such as multiply or divide the value in A by powers of two, and subtract the value in B therefrom. This would be accomplished by shifting the value in register A by three positions to the right (for dividing by eight) and placing zeroes in the abdicated bit positions, and then taking the resulting value and subtracting the value in register B therefrom in a manner well known to those skilled in the art. In a similar manner, the shifter can be used to conduct a power of two multiplication prior to a subtraction, addition or other function.

Other objects, features, and advantages of the invention will become apparent to those skilled in the art upon reference to the following detailed description of the invention and the accompanying drawings.

DETAILED DESCRIPTION OF THE PREFERRED EMBODIMENT

Figure 1A:
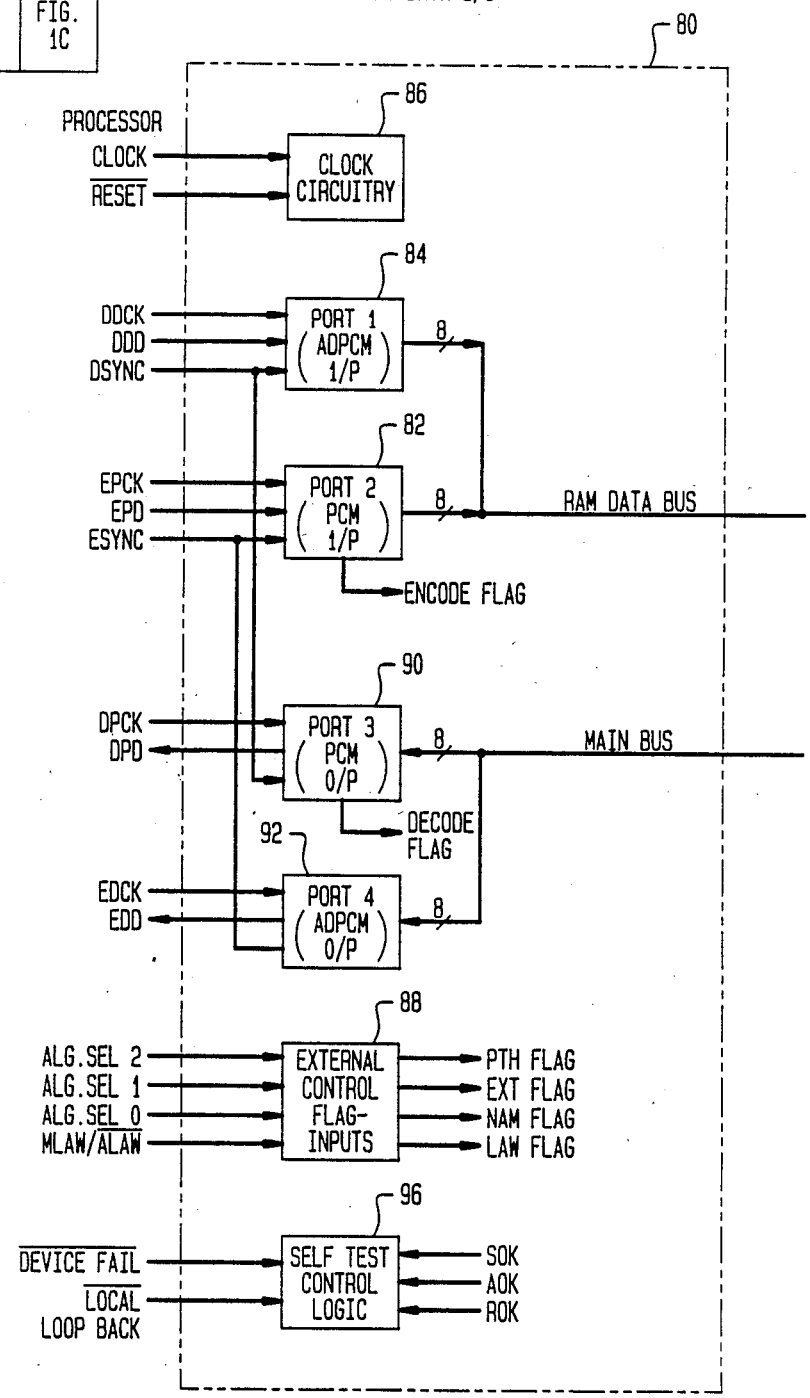
FIG. 1 is a shows the interconnection of FIGS. 1A-1C which are block diagrams of a digital signal processor incorporating the PALU of the invention, and the I/O section of the VLSI on which the digital signal processor is implemented.
Figure 1B:
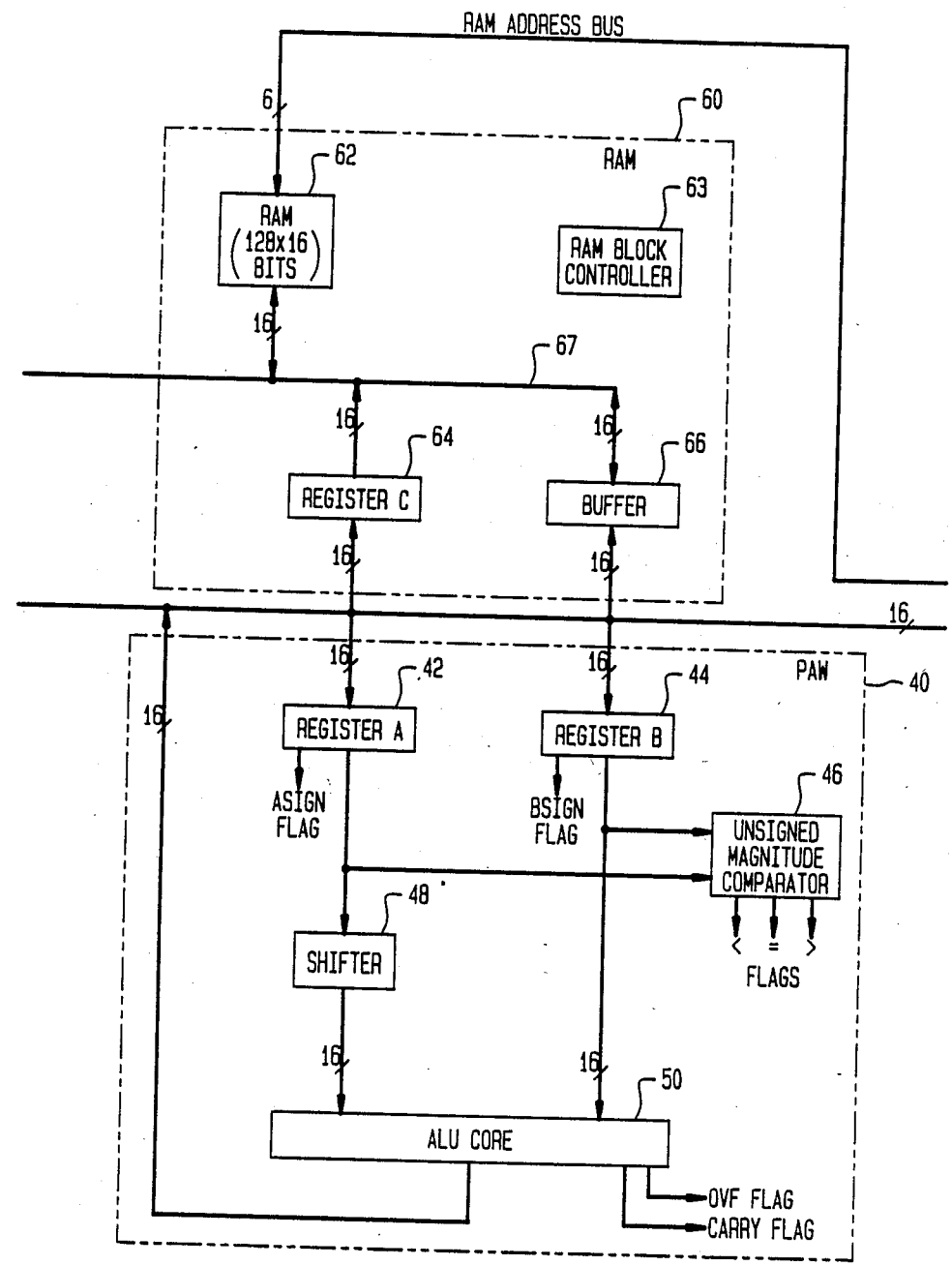

The preferred PALU 40 of the invention is seen in FIG. 1, and preferably comprises: a first register 42 (register A) for storing data; a second register 44 (register B) for storing data; an unsigned magnitude comparator means 46; a shifter 48 for shifting the bits in register 20; and an arithmetic-logic core means 50 for performing arithmetic, logic, and data move functions. As is suggested by FIG. 1, registers 42 and 44, shifter 48, and the arithmetic-logic core 50 are all controlled by a microinstruction sequencer which can select registers 42 and 44, provide shift control bits to shifter 48, and provide function control bits to arithmetic-logic core 50.

Registers 42 and 44 are preferably sixteen bits in length. Both registers are loaded on the positive edge of the clock by the application of an active low select derived from decoded microinstruction sequencer instructions called REG A SEL and REG B SEL respectively. The most significant bit of both registers 42 and 44 are output to the microinstruction sequencer as register 42 and register 44 sign bit flags, named ASIGN and BSIGN respectively.

The shifter 48 is located between register 42 and the "A" input into the arithmetic-logic unit core 50. The shifter thereby enables a shift operation to be performed on the data held in register 42. While a large range of shift values could be supported by the shifter, for purposes of implementing the ADPCM algorithm, the shifter 48 supports as many as eight shifts to the right (with extension of the sign bit), and as many as four shifts to the left (with zero filling of the bits to the right of the lsb). In this manner, the value in register 42 may be divided by two for a single shift right, by four for two shifts right . . . and by two hundred and fifty-six if eight right shifts are carried out. Likewise, the value in register 20 may be multiplied by two for a single shift left . . . and by sixteen for four shifts left. The number and direction of shifting is supplied by control bits decoded in the ALU decode register of the microinstruction sequencer. To permit the thirteen shift states ($-8$ to 0 to 4), four bits (which could support sixteen . . . states) are required.

The unsigned magnitude comparator 46 continually performs an unsigned comparison on the values stored in registers 42 and 44. Logic means (not shown) are preferably used to make the comparison. As a result of the comparison, the comparator 46 preferably outputs five flag combinations (3 flag bits) representative of the following conditions: Register 42 > Register 44; Register 42 = Register 44; Register 42 < Register 44; Register 42 > = Register 44; and Register 42 < = Register 44; with the latter two conditions being derived from the former three conditions. The three output flags are sent to the microinstruction sequencer, for among other reasons, to help it determine the truth of a conditional such that it will be able to properly instruct the arithmetic-logic unit core 50 as to the function it is to execute.

The provision of the comparator (which may be an unsigned magnitude, signed magnitude, or two's compliment comparator as desired) for continually comparing the outputs of registers 42 and 44 is a significant feature of the digital signal processor which is provided to implement the ADPCM algorithm. Without the comparator, compare operations would have to be conducted by the arithmetic-logic unit core 50 via subtraction techniques. As a result, two passes through the PALU 40 would be required to conduct a conditional arithmetic, conditional data move, or conditional logical instruction, thereby slowing down the process. Moreover, ROM space in the microinstruction sequencer would have to be expanded as additional instructions would be required to conduct a conditional instruction.

The preferred arithmetic-logic core 50 of the invention is provided with the capability of performing the following arithmetic, logical and data move operations:

| | |
|---|---|
| A SUB B | register 42 as shifted minus register 44 |
| A SBB B | register 44 minus register 42 as shifted |
| A ADD B | register 42 as shifted plus register 44 |
| CVT B | convert register 44 from two's complement to sign magnitude or visa versa |
| ABS B | absolute value of register 44 |
| NEG B | negate value of register 44 |
| INC B | increment value of register 44 |
| DEC B | decrement value of register 44 |
| A XOR B | XOR function register 42 as shifted with register 44 |
| A ORR B | OR function register 42 as shifted with register 44 |
| A AND B | AND function register 42 as shifted with register 44 |
| MVA | place contents of register 42 as shifted onto bus |
| MVNA | place complement of shifted register 42 onto bus |
| MVB | place contents of register 44 onto bus |
| MVNB | place complement of register 44 onto bus |

The means for accomplishing most of the above-listed functions in the arithmetic-logic core means are well known to those skilled in the art. In fact, even the ABS B and CVT B functions which are not standard in PALU's, could be easily implemented in a PALU by one skilled in the art.

As with the control bits for the shifter 48, the four control bits for determining which function the arithmetic-logic core means will execute is supplied by control bits decoded in the ALU decode register of the microinstruction sequencer. In turn, the arithmetic-logic core 50 supplies the microinstruction sequencer with two flags which indicate arithmetic overflow and carry conditions in the arithmetic-logic core 50.

With the provided registers 42 and 44, comparator 46, and arithmetic-logic core 50, it will be appreciated that a conditional operation such as an upper bound may be executed in a single pass through the PALU. Thus, after loading Register A 42 with first value, and Register B 44 with a second value, the comparative status of the registers (i.e. is A>B; is A=B; is A<B; is A>=B; is A<=B) will be automatically available to the microinstruction sequencer via the flags of the comparator 46. Without having to have first instructed the arithmetic-logic core 50 of the PALU 40 to subtract the value in Register B from the value in Register A to obtain a determination of the relative values, the microinstruction sequencer can then make a decision as to what value to set the value in Register A and can issue its first instruction to the arithmetic-logic core of the PALU. Microinstruction sequencer means for accomplishing this decision and function in a single microinstruction will be seen with reference to the patent application entitled "Microinstruction Sequencer Capable of Instructing Arithmetic Logical and Data Move Operations in a Conditional Manner" Ser. No. 069,430, which has already been incorporated herein by reference.

There has been described and illustrated herein a parallel arithmetic-logic unit capable of executing conditional arithmetic, logical and data move operations in a single pass. While each element of the PALU has been described in detail, it will be appreciated that it is within the scope of the invention to change such detail. Thus, while the arithmetic-logic core of the PALU has been particularly described with regard to the functions it can execute, those skilled in the art will appreciate that the core could be arranged to execute a different set of functions. Likewise, while an unsigned magnitude comparator is the comparator of choice, other types of comparators may be utilized. Further, while the comparator is described as continually comparing the values in the registers, it will be appreciated that the term "continually" is intended to mean that the comparison is conducted so very often that up-to-date results will be available without waiting for the comparison. Further yet, while particular elements of the PALU have been disclosed, additional elements can be provided such as additional input registers, an accumulator at the output of the PALU, and additional comparators for comparing the additional input registers. In addition, the elements can be connected differently such as a comparator which compares an input register with a shifted value, or a direct connection of the arithmetic-logic core to the data bus. With such a data bus connection, immediate data PALU instructions or RAM data for a specific PALU operation can be supported. Therefore, it will be apparent to those skilled in the art that other changes and modifications may be made to the invention as described in the specification without departing from the spirit and scope of the invention as so claimed.

I claim:

1. A parallel arithmetic-logic unit controlled by a microinstruction sequencer, comprising:
    (a) a first register for storing data;
    (b) a second register for storing data;
    (c) a comparator means, including means for setting at least one flag, said comparator means being connected to said first and second registers, for continually comparing the values of the data in said first and second registers and causing said flag setting means to set at least one flag depending on the results of the comparison, wherein said at least one flag is read by said microinstruction sequencer; and
    (d) an arithmetic-logic core means connected to said first and second registers for performing at least one of an arithmetic, logic and data move operation on at least the data in one of said first and second registers based on instructions from said microinstruction sequencer which were at least partially formed in response to said at least one flag.

2. A parallel arithmetic-logic unit according to claim 1, further comprising:
    (e) at least one shifter connected between at least one of said first and second registers and said arithmetic-logic core means.

3. A parallel arithmetic-logic unit according to claim 2, wherein:
    each of said at least one shifter reads the data of its associated register, shifts the data in response to instructions of said microinstruction sequencer, and supplies the shifted data to said arithmetic-logic core means.

4. A parallel arithmetic-logic unit according to claim 2, wherein:
    said at least one shifter comprises an unsigned magnitude shifter.

5. A parallel arithmetic-logic unit according to claim 1, wherein:
    said arithmetic-logic core performs the subtracting the value in said first register from the value in said second register, subtracting the value in said second register from the value in said first register, and adding the value in said first register to the value in said second register.

6. A parallel arithmetic-logic unit according to claim 5, wherein:
    said arithmetic-logic core further performs the incrementing and decrementing the value of at least one of said first and second registers, negating the value of at least one of said first and second registers, and providing an absolute value of a value in at least one of said first and second registers.

7. A parallel arithmetic-logic unit according to claim 6, wherein:
    said arithmetic-logic core further performs the converting a two's complement value in one of said first and second registers to a signed magnitude value, and converting a signed magnitude value is one of said first and second registers into a two's complement value.

8. A parallel arithmetic-logic unit according to claim 6, wherein:
    said arithmetic-logic core further performs the conducting a logical exclusive OR function on the values in said first and second registers, conducting a logical OR function on the values in said first and second registers, and conducting a logical AND function on the values in said first and second registers.

9. A parallel arithmetic-logic unit according to claim 5, further comprising:
   (e) at least one shifter connected between at least one of said first and second registers and said arithmetic-logic core means, wherein each of said at least one shifter reads the data of its associated register, shifts the data in response to instructions of said microinstruction sequencer, and supplies the shifted data to said arithmetic-logic core means, and wherein said arithmetic-logic core performs the shifting the bits of the value in said first register and subtracting the shifted value from the value in said second register, shifting the bits of the value in said first register an d subtracting the value in said second register from the shifted value, and shifting the bits of the value in said first register and adding the shifted value to the value in said second register.

10. A parallel arithmetic-lgoic unit according to claim 1 wherein:
   said arithmetic-logic core performs the converting a two's complement value in one of said first and second registers to a signed magnitude value, and converting a signed magnitude value is one of said first and second registers into a two's complement value.

11. A parallel arithmetic-logic unit according to claim 1, wherein:
   said at least one flag comprises at least two flags for indicating when the value in said first register is greater than the value in said second register, when the value in said first register is equal to the value in said second register, and when the value in said first register is less than the value in said second register.

12. A parallel arithmetic-logic unit according to claim 11 wherein:
   said at least two flags comprises three flags for also indicating when the value in said first register is greater than or equal to the value in said second register, and when the value in said first register is less than or equal to the value in said second register.

* * * * *